Sept. 18, 1945.   A. ZUCKERMANN   2,384,869
SIGNALING OR ADVERTISING DEVICE
Filed April 24, 1940   4 Sheets-Sheet 1

INVENTOR:
ARMAND ZUCKERMANN
BY Haseltine Lake & Co.
ATTORNEYS

Sept. 18, 1945.  A. ZUCKERMANN  2,384,869
SIGNALING OR ADVERTISING DEVICE
Filed April 24, 1940  4 Sheets-Sheet 2
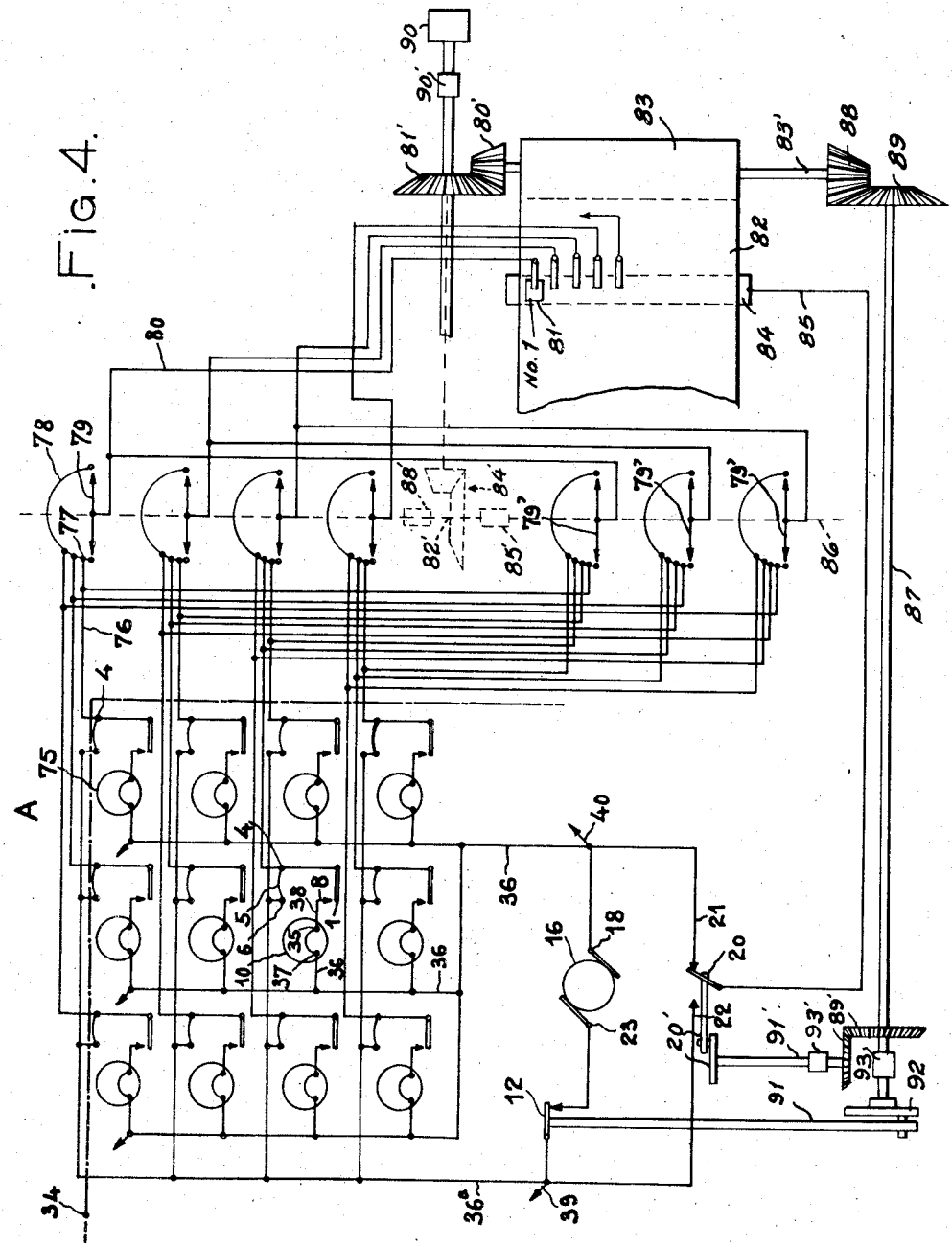
INVENTOR:
ARMAND ZUCKERMANN
BY Haseltine Lake & Co.
ATTORNEYS Sept. 18, 1945. A. ZUCKERMANN 2,384,869
SIGNALING OR ADVERTISING DEVICE
Filed April 24, 1940 4 Sheets-Sheet 3
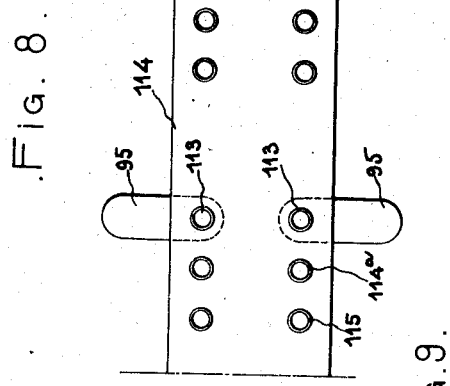
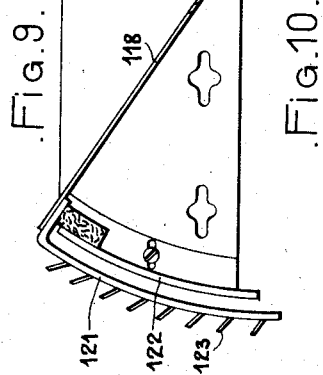
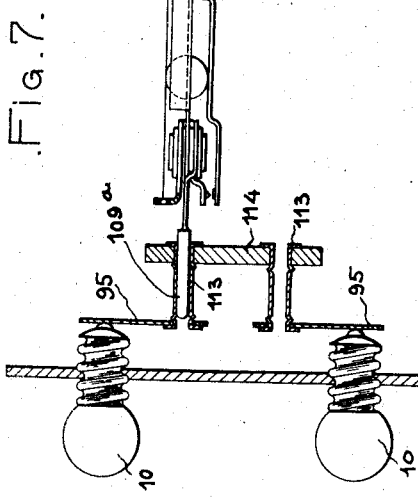
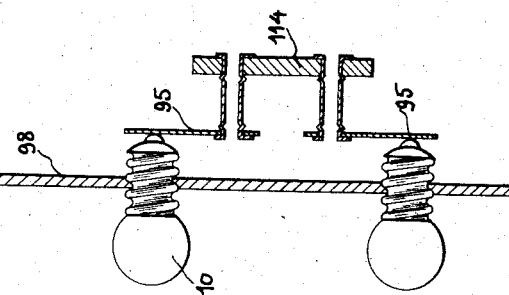
INVENTOR:
ARMAND ZUCKERMANN
BY Haseltine Lake & Co.
ATTORNEYS Sept. 18, 1945.                A. ZUCKERMANN                 2,384,869
                         SIGNALING OR ADVERTISING DEVICE
                     Filed April 24, 1940        4 Sheets-Sheet 4
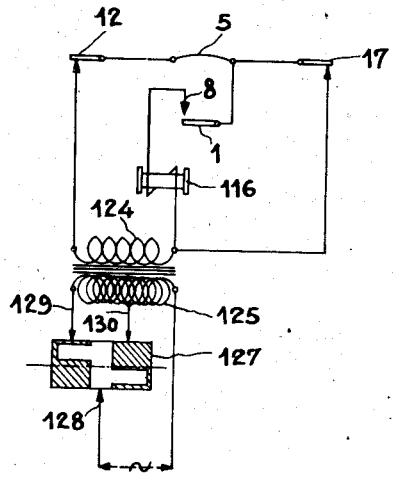
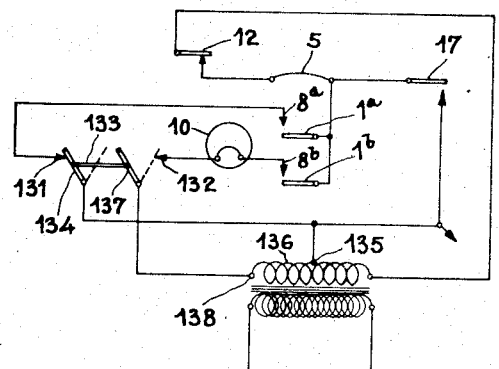
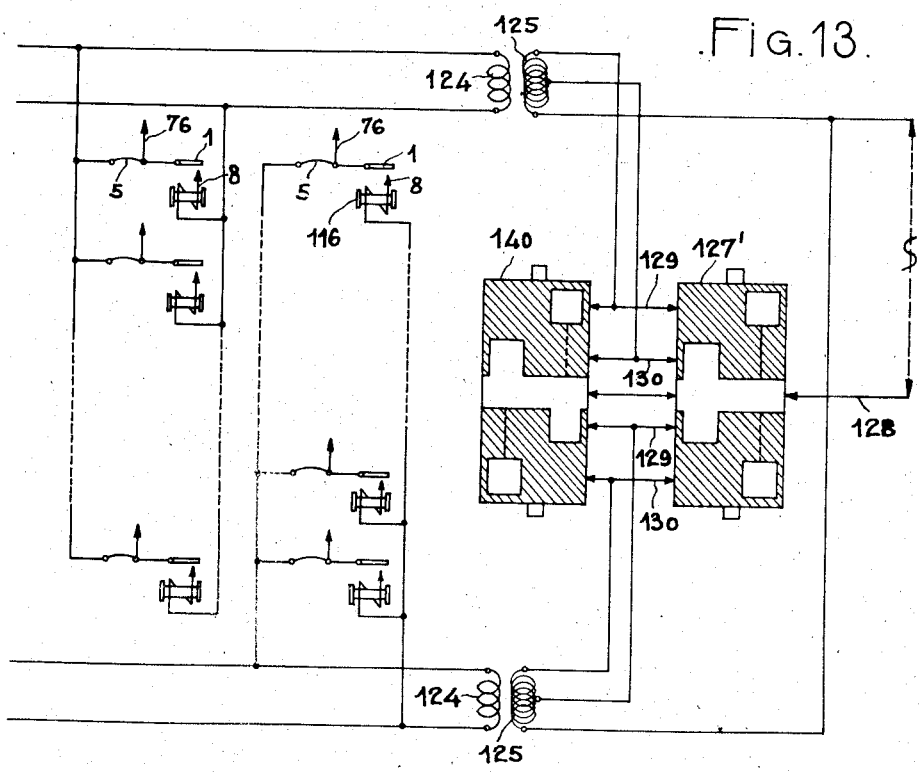
INVENTOR:
ARMAND ZUCKERMANN
BY Haseltine Lake & Co.
ATTORNEYS Patented Sept. 18, 1945

2,384,869

UNITED STATES PATENT OFFICE 2,384,869

SIGNALING OR ADVERTISING DEVICE

Armand Zuckermann, Paris, France; vested in the Alien Property Custodian

Application April 24, 1940, Serial No. 331,281 In France May 16, 1939

12 Claims. (Cl. 177—350)

Signaling or advertising devices are already known which are constituted by boards having juxtaposed elements capable of changing their aspect under the action of an external manual or automatic control device. These elements are, for instance, lamps which light or go out, or reflecting surfaces visible in a certain so-called working position and invisible in another so-called rest position, either by the displacement of said surfaces, or by the displacement of a shield which covers them, or on the contrary, uncovers them, according to its position. The device controlling said elements comprises switching-means which allow some of said elements to be given, simultaneously or successivly, their working aspect, for forming certain figures, and to maintain said aspect until a reverse manipulation is effected which restores them to their rest aspect.

For solving this problem, use has been made, up to now, for each element, of a relay which will be called herein energising relay, because it is its energisation which causes, directly or indirectly, the corresponding element to assume its working aspect. Two cases must then be considered, according as the element is devised to automatically assume its rest aspect as soon as the energisation ceases or as it mainttains its working aspect after the energisation has ceased. In the first case, a holding circuit must obviously be provided for each relay, the return to rest aspect taking place by simply cutting off said holding circuit; in the second case, a special device must be provided, for instance an electric, mechanical or pneumatic device which restores their rest aspect, at the required moment to the elements which have maintained their working aspect.

Owing to the lack of ruggedness of the energising relays used up to now, it had always been considered as impossible to place said relays in the immediate vicinity of the optical elements, and for instance on the rear or dorsal face of the board supporting them. The considerable advantage that would be obtained in placing the energising relays in the immediate vicinity of the elements had indeed been admitted, but objection was raised against the necessity of sheltering said relays for protecting them to the maximum from the external influences which would be prejudicial thereto, and against the necessity, none the less imperative, of them protecting each circuit of the elements by a fuse-wire, since the length of wire between the contact of the relay and the element would be very short and would no longer constitute a protecting resistance. It was set forth that the expense of a fuse-wire for each element would compensate the advantages which might be obtained in arranging the relays in immediate vicinity of the elements.

The invention is adapted to satisfy the double condition of placing the relays in the immediate vicinity of the elements and of eliminating the necessity of using protecting fuse-wires.

For that purpose, it is characterised by the novel application to signaling or advertising apparatus of the type described, of relays having an expansible conducting wire, this novel application being moreover distinguished by the fact that said expansible conducting wire is common to the circuit of the element and to an energising circuit, so as to be heated by the temporary closing of said energising circuit and to be kept heated by the closing of the main circuit, determined by its lengthening.

It will be understood that such relays, very rugged and proof against getting out of order by the variations of external temperature provided that the support for the wire is made of a material having a coefficient of linear expansion approximating that of the wire, can without objection, be placed at the back of the board or panel supporting the elements; and that, moreover, the expansible wire, which is located in the circuit of the element, constitutes in its self a protection for the circuit in the same manner as a fuse-wire.

The accompanying drawings illustrate, by way of example only, some forms of carrying out the invention.

Fig. 4 is a general diagram.

Fig. 7 is an elevation of the method of mounting the relay on the board.

Fig. 8 is a detail view in elevation.

Fig. 9 shows a sectional elevation of another embodiment.

Fig. 10 is a plan view thereof.

Fig. 11 is a wiring diagram.

Fig. 12 shows another wiring diagram.

Fig. 13 is still another diagram.

Figure 1:
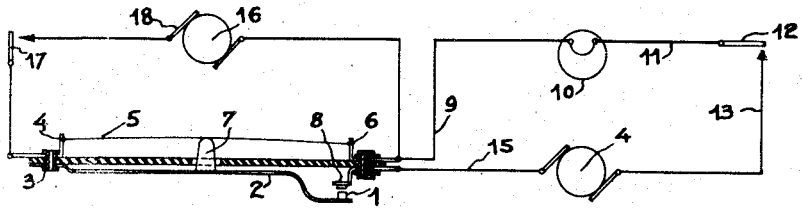
Fig. 1 is a diagram of a first method of wiring; in this diagram, the relay having an expansible conducting wire is illustrated in a simplified form, but it is to be understood that, in said Fig. 1 as well as in Figs. 2 and 3, mentioned hereinafter, it is intended to indicate a relay according to the embodiment illustrated in detail in Figs. 5 and 6 indicated hereinafter.

For effecting the initial energisation, that is to say, to raise the temperature of the wire:

(a) As in the example of Fig. 1, use can be made of a special energising circuit having a particular source of electric energy. In this figure, the movable contact 1 is carried at the end of a resilient blade 2 held at 3 and connected at this place to one of the points 4 where the expansible conducting wire 5 is attached. Said expansible wire 5 is stretched between the point 4 and the point 6, substantially parallel to the resilient blade 2 which presses by means of the insulating push-piece 7 near the middle of the wire 5, so that the movable contact 1 cannot, at ordinary temperature, touch the fixed contact 8. The point 6 is connected by the wire 9 to the lamp 10 (or any other optical element as explained), connected by the wire 11 to the switch 12, then by the wire 13 to a first source of current 14, connected, in its turn, by the wire 15, to the fixed contact 8. Finally, another source of current 16, which is to effect the energisation, is connected, on the one hand, through the medium of the switch 17, to the end 4 of the wire 5 and, on the other hand, to the end 6 of said wire.

In the position illustrated, all the circuits are open. For causing the device to operate, the contact 12 is first closed, which at this moment has no effect, since closed contact 12 is in series with contacts 1 and 8 which do not touch each other. But if contact 17 is closed for an instant, the expansible wire 5 is fed by the source of current 16 and rapidly heats up. Wire 5 lengthens, so that the spring 2 can expand upwardly, with the result that the contacts 1 and 8 can touch each other. It will be noted, as an important point, that their contact pressure is determined solely by the strength of the spring, as soon as the wire 5 has lengthened sufficiently.

The utilisation circuit is then closed and the current of said circuit passes through wire 5 which is maintained at a high temperature. Consequently said circuit remains closed until it is intentionally opened, by actuating the switch 12. At this moment, of course, wire 5 is no longer fed with current. It cools, stretches again, compels the spring 2 to inflect downwardly and thereby cuts off the contact 1—8. Further closing of contact 12 will no longer produce any effect, it will be necessary to act on contact 17 in order for the operation just described to take place again.

Figure 2:
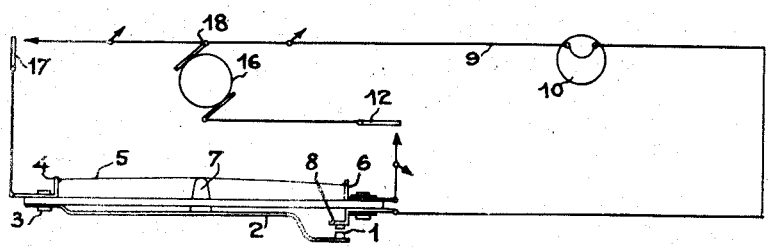
Fig. 2 is a diagram of a second method of wiring.

(b) Also, as in the example of Fig. 2, contacts 1—8 normally open can be short-circuited for producing the energisation, and consequently but a single source of electric current 16 need be used. In this case, it suffices to connect the wire 9 of Fig. 1, not to point 6, but to the pole 18 of the source of current 16, and to dispense with the source of current 14. The diagram of Fig. 2 is then obtained, in which it will easily be seen that by temporarily closing the switch 17, wire 5 is placed in circuit (provided that switch 12 has been previously closed). Said wire heats up and closes the contacts 1—8, thereby closing the circuit of the lamp 10, said circuit remaining closed until the contact 12 is temporarily opened.

Figure 3:
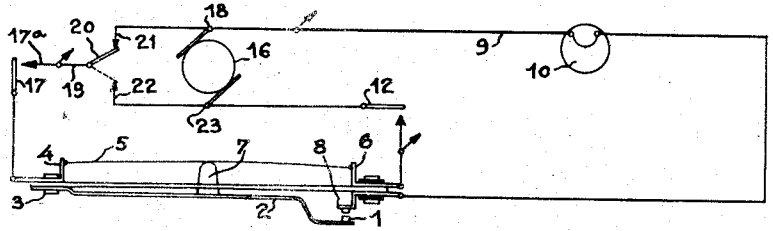
Fig. 3 is a diagram of a third method of wiring.

It is to be mentioned that contact 12 is only one means, among others, for cutting off the circuit of utilisation. Other means can be used for that purpose, which all consist in effecting in any manner whatever, the cooling of wire 5. For instance, this cooling can be obtained by short-circuiting said wire (Fig. 3). In this example, the fixed contact 17ª is connected by the wire 19 to a switch 20 having a fixed contact 21 connected to the pole 18 of the source of current 16, and another fixed contact 22 connected to the second pole 23.

When the switch 20 is in the position illustrated, in which it touches the contact 21, the diagram of Fig. 2 is obtained and, consequently, the temporary closing of contact 17 determines the energization of wire 5 and the closing of the circuit of the optical element, as explained. But, when, on the contrary, the switch 20 touches the contact 22, the temporary closing of contact 17 has the effect of short-circuiting wire 5; therefore, when said contact 17 is closed, wire 5 is no longer fed with current, as the difference of potential between points 23 and 4 becomes practically null; wire 5 therefore cools and contacts 1 and 8 separate.

In this arrangement it will be noted that the element 10 is slightly boosted when the switch 20 being in contact with 22, contact 17 is temporarily closed. This particularity can, in certain applications, be considered as an advantage; for instance, if the element 10 is a lamp, said lamp shines with a brighter light before it goes out, and it may be that, for advertising or signaling purposes, advantage may be taken of this property. Moreover, it will be noted that if the period during which contact 17 is closed is very short, it will not produce the opening of contacts 1—8, as wire 5 will not have time to cool; thus, by means of contact 17 can be obtained, either the energization of 10 when contacts 20—21 are closed, or, when contacts 20—22 are closed, the temporary boosting of 10 followed or not by its de-energization. This property can in certain cases be of very great interest.

In all the embodiments described, it can clearly be seen:

That the use of heat, during energization is excellent; the energy consumed is in fact entirely used in the wire;

That the temperature reaches such a high degree (for instance 300 to 350°) that the operation is entirely independent of the variations of the external temperature;

That the cooling is rapid, for the very reason of the relatively high temperatures of operation, and owing to the fact that the wire is in the best conditions for cooling;

That wire 5 offers the great advantage of also constituting fuse-wire protecting the element such as 10.

Having described the relay according to the invention, some methods of application thereof will now be set forth. In the example of Fig. 4, a board 34 is provided with lamps juxtaposed in vertical and horizontal rows; some of said lamps only are diagrammatically illustrated for instance at 10 and 75. The connections of lamp 10 will simply be described, for instance, as they are the same for the other lamps. The terminal 35 of lamp 10 is connected by a wire 38 to point 8 of a relay according to preceding Figure 3, and point 6 is connected by the switch 12 to the pole 23 of the source 16 of electric energy, the second pole 18 of which is connected by a wire 36 to the second terminal 37 of the lamp 10. The wires 36ª and 36 are respectively multiplied, as diagrammatically illustrated by the arrows 39 and 40, on all the other lamps of the board.

The point 4 of the relays respectively associated with the lamps such as 75 of one and the same first vertical row A are connected by wires such as 76 to the first active contact-pieces 77 of a series of contact banks 78 each comprising as many contacts as there are lamps in one and the same horizontal row. There are as many contact banks 78 as there are horizontal rows.

The wipers 79 corresponding to each contact bank are independently connected by wires such as 80 to brushes 81 placed above a perforated band 82 mounted for instance on rollers 83. The brushes 81 are arranged transversely to said band above a conducting table 84, connected by the wire 85 to the suitable terminal of the source of energy 16. Finally, the wipers 79 are all driven simultaneously and in synchronism with the perforated band 82, in such a manner that a hole of the band can present itself under a brush 81 only when the wipers such as 79 touch the contacts of a definite line, in each of the contact banks. The movement of the wipers 79 and of the band 82 can be continuous or discontinuous and of uniform or variable speed, but must be synchronous.

Each wiper 81 and 79 thus controls the lamps of one and the same horizontal row; if it is assumed that there are $x$ lamps in a vertical row, there will therefore be $x$ wipers 81—79; and if there are $y$ lamps in a horizontal row, each contact bank 78 scanned by a wiper such as 79 comprises $y$ contacts.

The operation is as follows: when the wipers 79 are on the contacts N° 1, the lamps of the vertical row N° 1 are subjected to the control of the perforated band 82. Some of the wipers 81, passing through the perforations, are, at this moment, in contact with the table 84. Consequently, the lamps of the first vertical row corresponding to said holes of the perforated band, light. Then, the wipers 79 as well as the perforated band 82 move one step forward.

The wipers 79 then touch the contacts corresponding to the second vertical row of lamps, which are then controlled by the perforated band 82. The operation is repeated up to the last vertical row of lamps. At this moment, the movement of the wipers 79 and of the band 82 is stopped for a time either by disconnecting the driving means which will be described later or by stopping the driving means itself; then the contact 12 is opened for effecting automatically or not, the extinguishing of the lamps. Finally, the device repeats its cycle, after the driving means has been either connected or started. Or else the switch 20 can be moved on to the contact-piece 22 and ensure the extinguishing, lamp after lamp, according to all possible combinations.

The coordination of the synchronous movements of the perforated band 82 and wipers 79 can be obtained by any known means, and in particular by a simple kinematic connection between the shafts of 83 and of 79, such as gearing 80', 81', 84' interconnecting distributor shaft 83' of roller 83, gear 81' being operatively connected with driving means 90, such as an electric motor over an ordinary clutch 90' for disconnecting the said driving means at the end of each cycle. A further shaft 87 is also driven by shaft 83' through gearing 88, 89 mounted on shafts 83' and 87. The switch 12 is operated by means of a link 91 connected to and operated by a crank 92 on said shaft 87, while roller 83 rotates. If according to an alternative means of operation, as described above, switch 20 instead of switch 12 is used for the control of the system, an actuating mechanism 20' driven by shaft 87 over a gearing 89' and a shaft 91' is operatively connected to switch 20. It is to be understood that either switch 12 or switch 20 can be used as controlling means, thus either the one or the other of their respective driving and actuating means being rendered ineffective, for example by means of clutches 93 and 93'. If switch 12 is to be used, switch 20 has to be connected to conductor 21, whereas the control of th system by switch 20 requires a closed switch 12.

Figure 5:
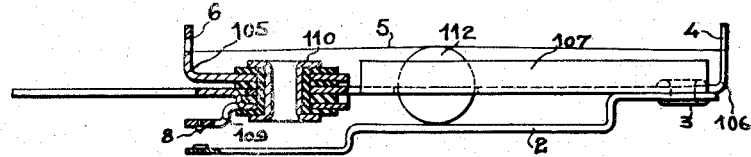
Fig. 5 shows a sectional elevation of the preferred form of relay.
Figure 6:
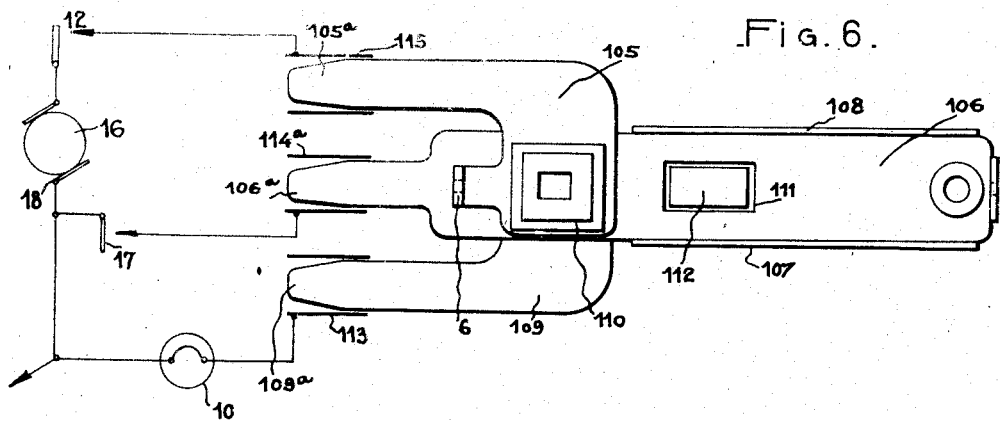
Fig. 6 is a plan view thereof.

Figs. 5 and 6 illustrate a practical form of construction of the relay. In this example, the point 6 of attachment of the expansible wire 5 is provided on a cut-out member 105, the shape of which will be more fully described later on; and the point 4 is provided on the member 106 which is substantially flat, except as regards the bent up lug which constitutes the point of attachment 4 and two flanges 107 and 108 also bent up which ensure the rigidity of the whole. The member 106 terminates in a plug 106ª. Finally the point 8 is provided on a third cut-out member 109.

The members 105, 106 and 109 are superposed with the interposition of insulating washers, and mechanically connected by a grommet 110; but they are electrically insulated. The members 105 and 109 are slightly bent back so that their ends 105ª and 109ª, in the form of plugs, are in the same plane as the plug 106ª.

Finally, the resilient blade 2 is secured at 3 on the member 106, which is perforated at 111 for the passage of the disc 112, made of insulating material which is interposed between the wire 5 and the resilient blade 2.

Fig. 6 is completed by a wiring diagram quite identical to that of Fig. 2, which renders unnecessary any complementary description of this embodiment.

Figs. 7 and 8 then show the manner in which the board of lamps is fitted up. This board comprises a conducting plate 98 in which the lamps 10 are screwed, the base of the lamps pressing against spring blades 95. Said blades 95 are secured on thimbles 113, mounted in their turn on insulating cross members 114, also receiving other thimbles 114ª and 115. The thimbles 115 correspond to the plugs 105ª, thimbles 114ª to the plugs 106ª and thimbles 113 to plugs 109ª, as clearly shown in Fig. 6. It is therefore a very simple matter to replace or exchange a relay such as that illlustrated in Figs. 5 and 6, since it suffices to remove a member having three plugs and replace it by another, without having to effect any connection, just as if it were a wall-plug or a fuse.

In all the foregoing embodiments, the relay according to the invention was used in combination with lamps; but it can also be utilised in combination with electromagnets for actuating and changing from rest aspect to working aspect, and vice versa, an optical element which is not a lamp, but a surface means, which, in a certain so-called working aspect, reflects, refracts or diffuses luminous rays arising from any source whatever illuminating the board, whereas in another so-called rest aspect, it is, for instance, invisible. It is to be understood that this definition includes not only surface means which pass from one aspect to the other by changing their position, but also those which pass from one aspect to the other, by the displacement of an auxiliary member such as a movable shield with, for instance, illumination behind the board.

In the example of Figs. 9 and 10 the relay is combined with an electromagnet 116 the movable armature 117 of which is kinematically connected to a lever 118 through the medium of a flexible strap 119, for instance of leather or rubber. The lever 118 is pivoted at 120 and it carries a circular guide 120' for the strap 119; the latter, in fact, winds on the guide 120' the axis of which coincides with that of the pivot 120. The lever 118 might also be supported by a flexible blade made of spring steel, which would allow it to move angularly without having recourse to a pivot.

The lever 118 carries a spherical shield 121 which, in rest position, screens a mirror 122 adjustable in position which constitutes the optical element, reflecting, when it is uncovered, the light towards the observer's eye. The shield 121 is provided with inclined fins 123 constituting a dark background avoiding any interfering reflections, in such a manner that the board, when all the shutters 121 are in their position of rest, appears entirely black. It will be understood that when the electromagnet 116 is suitably energised, the armature 117 is attracted and the shutter 118 moves angularly and upwardly uncovering the mirror 122. The latter, illuminated by daylight or artificial light, then appears brilliant against the black background.

In an arrangement of this kind, and in the case in which the current supplied is alternating current, it is possible to effect, for controlling the shutter 121, two operations with a single contact. One of these operations consists in energising the relay having an expansible wire (already described) without however actuating the shutter, with the device of Figs. 9 and 10 substituted for lamp 10, this operation will be called recording. During the second operation the actuation of the shutter is produced. This arrangement will be described later.

This possibility offers great advantage; as it allows, for instance, of preparing a drawing, or a part of the drawing, and causing it to appear or to disappear at a single stroke and as many times as desired, making its possible to obtain a twinkling or flickering which decidedly attracts more the attention of the public. For that purpose, the relay is devised in such a manner that it can be energised by a relatively low voltage, for instance 8 volts, and the electromagnet 116 is so constructed with too large a capacity so that it cannot be sufficiently energised by said voltage. Consequently, when the 8 volt tension is applied, the expansible wire 5 lengthens, and causes the closing of contacts 1 and 8, thereby causing low voltage current to pass into the electromagnet 116 which is not energised, and maintains the relay energised. When the 12 volt tension is then applied, the electromagnet 116 is fully energised, attracts the armature 117 and, by means of the strap 119 causes the lever 118 to pivot. The shutter or shield 121 then uncovers the mirror 122 which appears.

It is to be noted that the 12 volt tension determines at the beginning in the expansible wire an intensity sufficiently high for it to become dangerous if it lasted, but in proportion as the core 117 penetrates into the winding 116, the self induction of the coil increases, which has the effect of reducing the intensity to a value just sufficient for maintaining the relay energised and of reducing the consumption by the diminution of the intensity and the increase of the phase displacement.

If the 4 volt over-voltage is eliminated, the electromagnet 116 ceases to be sufficiently energised and the shutter 121 falls back; by re-establishing said over-voltage, the operation described starts again. It is therefore possible to obtain the twinkling of the apparatus in this manner.

Fig. 11 diagrammatically illustrates an arrangement of this kind. In this diagram, the expansible wire is shown at 5, and the contacts 1 and 8 are separated therefrom, but it is to be understood that the wiring is the same as previously. The circuit of utilisation is fed by the secondary 124 of a voltage reducing transformer, the primary 125 of which is fed by the source of energy 126 through a rotary commutating switch 127 so devised as to connect the terminal 128 to one of the two terminals 129 or 130. It is then obvious that according to the rotated position of 127 the circuit of utilisation is fed under high voltage (when 128 is connected to 130) or under low voltage (when 128 is connected to 129). In this latter case, the closing of contact 17 suffices to energise the wire 5, but not the electromagnet 116 after the closing of contacts 1 and 8; consequently, the recording is obtained in this position. If the switch 127 is then caused to rotate, 128 and 130 are connected which determines the energization of the electromagnet 116. By returning to the first position, the feeding of the utilisation circuit is stopped during a short moment, so that 116 de-energises, but not the wire 5, the deenergization of which would require an interruption of longer duration. Then the circuit of utilisation is again fed with low voltage current, which maintains the recording and so on. The twinkling of the apparatus is thus obtained as described in connection with Figs. 9 and 10.

The example of Fig. 12 relates to the case in which the signaling elements are lamps 10; in this case the preceding diagram cannot be applied, as even with a voltage much lower than normal voltage, the lamps would still be visible. Contacts 1—8 are then replaced by two series of contacts 1ª—8ª and 1ᵇ—8ᵇ. Contact 8ª is connected to the contact 131 of a switch 133 and contact 8ᵇ is connected through lamp 10 to the contact 132 of said switch 133.

The arm 134 is connected to the point 135 of the feeding secondary 136, whereas the arm 137 is connected to the point 138 of said secondary. In the position illustrated, the circuit is therefore fed with low votage current through contacts 8ª and 1ª for recording, when contact 17 closes, but the circuit of lamp 10 is open. In the reverse position, as indicated in broken lines, the circuit of wire 5 is fed with high voltage current through contacts 8ᵇ and 1ᵇ, said wire 5 being then in series with lamp 10. Once the recording is effected in the position illustrated, the twinkling is produced by the periodic actuation of the switch 133.

Figs. 11 and 12 show diagrammatically modifications of the inventive system, as applied to a single indicating device. Actually, said modifications are intended to be used in a system, as shown in Fig. 4. In this case the transformers in Figs. 11 and 12 would replace the current source 16 in Fig. 4, or more specifically, the secondary 124 or 136 respectively, of the transformers in Figs. 11 or 12 are to be connected at 23 and 18, respectively, with the circuit in Fig. 4. The indicating devices in Figs. 11 and 12 including their relays are to be multiplied, as shown in Fig. 4.

In the example of Fig. 4, the use of a rotary distributor 79 has been described which allows of obtaining a drawing by the successive scanning of the vertical or horizontal lines; but, on the same apparatus, a second distributor 79' can be provided which, whereas the first distributor 79 scans the drawing through vertical lines, allows the drawing to be scanned through horizontal lines. One or the other of said distributors is set in action, each of which having a position of rest in which the wipers 79 or 79' are in contact with dead contact-pieces. While one of them operates the other is at rest. The wires such as 76 are then suitably multiplied, as shown in Fig. 4. The second distributor 79' is driven by means of a shaft 86, which can be operatively connected over a gearing 84' over a conventional clutch or coupling means 85'. A similar clutch or coupling means 88' is provided between distributor shaft 82' and gearing 84'. Only one of said clutches 88' and 85' have to be in engaged position while the other one is disengaged, thus only one of the distributors is operative at one time.

Such an arrangement has the double advantage of avoiding monotony and of facilitating the tracing of the lines of any direction.

It would also be interesting to be able to cause to successively appear on the board, drawings corresponding, for instance to the successive phases of a movement, in order to obtain a rudimentary motion picture.

Fig. 13 shows a diagrammatic example of this kind of assemblage in which the elements are distributed in two series, somewhat resembling the grouping in Fig. 11 and utilizing two rotary switches, one of said series comprising for instance the rows of elements of an even number line (which are not necessarily rectilinear rows, but which can have any desired shape) the other series comprising the rows of odd number lines.

The circuit in Fig. 13 is a modification of the system in Fig. 11. In contrast to the latter, two separate two-voltage transformers, such as the one shown in Fig. 11, are used, each supplying one of said series of indicating elements. A switch 127', similar to switch 127 in Fig. 11, controls both primary windings 125 of said two transformers simultaneously in the same manner as switch 127 controls the one transformer in Fig. 11. Thus, by operating said switch 127' in Fig. 13 the same results are obtained as with the system in Fig. 11, i. e. all of the indicating elements are supplied with the same current either of lower or of higher voltage. During the operation of switch 127' a switch 140, which can be used alternately, is in neutral position, as shown in Fig. 13, in which its contacts are ineffective. Said switch 140 can be used instead of switch 127', if the latter is turned into its neutral or inoperative position. Switch 140 has also two operative positions, in the one of which, the primary windings 125 of the two transformers are controlled in such a manner that the secondary winding 124 of the one transformer supplies current of lower voltage to the one series of indicating elements, while the secondary winding 124 of the other transformer supplies current of higher voltage to the other series. In the second operative position of switch 140, the supply of currents of lower and higher voltage is reversed, thus, the said one series of indicating elements obtains the current of higher voltage, while said other series obtains the current of lower voltage. By moving switch 140 to different positions successively, the one and the other of said series of indicating elements are alternately fed with lower and higher voltage, thereby obtaining two phases of a motion picture. Since switches 140 and 127' can be used alternately, one of them always in neutral position, an additional variety in the performance of the signs is obtained. It is obvious that a plurality of such switches 140 can be used, instead of a single one, each of said switches cooperating with a separate portion of the board. The series of indicating elements controlled by said various switches 140 may have different colors. The circuit in Fig. 13 can be combined with the system in Fig. 4 as explained above in connection with Figs. 11 and 12.

What I claim as my invention and desire to secure by Letters Patent is:

1. In an electrically controlled indicating system, in combination, a plurality of indicating devices changeable in aspect in the course of one operative cycle and arranged in groups of rows in two intersecting directions, means for selecting said indicating devices in accordance with a predetermined pattern, said means comprising a gang of switch units, each having a contact bank with a plurality of contacts, the number of said switch units corresponding to the number of rows of said indicating devices in the one direction and the number of contacts of the banks in each unit corresponding to the number of rows of indicating devices in the other direction, and a contacting wiper moving over each bank, a preselector comprising a form operated translating and transmitting mechanism, forms in said mechanism bearing predetermined patterns, said forms being adapted to be moved through said mechanism, a set of contacts in said mechanism arranged over the width of said forms transverse to their moving direction and adapted to be rendered operative by said forms in accordance with the patterns on said forms, the number of the contacts of said set corresponding to the number of said contact banks, a common contact element in said mechanism opposite to said set, and being adapted to cooperate with the individual contacts of said set upon actuation of said individual contacts by said forms, a main circuit through said indicating devices being adapted to be connected with a source of electric current, said indicating devices having a common parallel circuit connection with said main circuit, said circuit being adapted to feed the system over said common connection and over said common contact element, switch means associated with said main circuit and being adapted to be held in operative position during the operation of said indicating devices, separate electric interconnections between each wiper of said units and each individual contact of said set in the sequence of said switch units as they are coordinated to the rows of the devices in the one direction, individual electric interconnections between the contacts of each of said banks and said indicating devices in the order of the devices in the rows of the other direction, an actuating means associated with each of said indicating devices in series connection to said latter individual interconnections, a circuit maintaining means also associated with each of said indicating devices, said actuating means being adapted to operate the corresponding maintaining means upon actuating by the coordinated contacts of said banks and said set, said maintaining means being adapted to keep the associated indicating device operative after the associated actuating device has become inoperative due to change of positions of the coordinated wiper, means for moving all wipers of said switch units simultaneously, means for transporting said forms through said mechanism, said moving and transporting means being synchronized in such a manner that said wipers run through one cycle after completion of one predetermined portion of said forms, an actuating mechanism for said switch means, said actuating mechanism being synchronized with said moving and transporting means so as to operate said switch means in such a manner that it is brought in operative position at the beginning of each cycle and in inoperative position at the end of each cycle, said switch means having two positions and being adapted to connect said source of current to said actuating means in the one, the operative position, and disconnect said source from said actuating means in the other, the non-operative position, a shunt circuit overbridging said actuating means, said shunt circuit including said switch means and the operative contacts of the means for selecting the indicating devices, said latter means being in series circuit connection with said actuating means, thereby rendering one after the other of said maintaining means inoperative, when the corresponding wiper and the corresponding brush completes the overbridging circuit through said selecting means under control of said forms, said forms each having one predetermined pattern controlling the sequence of said indicating devices in which they are rendered effective to indicate and having another predetermined pattern, behind the first pattern in the direction of movement of said forms, controlling the sequence of said indicating devices in which they are rendered ineffective.

2. In an electrically controlled indicating system, in combination, a plurality of indicating devices changeable in aspect in the course of one operative cycle and arranged in groups of rows in two intersecting directions, means for selecting said indicating devices in accordance with a predetermined pattern, said means comprising a gang of switch units, each having a contact bank with a plurality of contacts, the number of said switch units corresponding to the number of rows of said indicating devices in the one direction and the number of contacts of the banks in each unit corresponding to the number of rows of indicating devices in the other direction, and a contacting wiper moving over each bank, a pre-selector comprising a form-operated translating and transmitting mechanism, forms in said mechanism bearing predetermined patterns, said forms being adapted to be moved through said mechanism, a set of contacts in said mechanism arranged over the width of said forms transverse to their moving direction and adapted to be rendered operative by said forms in accordance with the patterns on said forms, the number of the contacts of said set corresponding to the number of said contact banks, a common contact element in said mechanism opposite to said set, and being adapted to cooperate with the individual contacts of said set upon actuation of said individual contacts by said forms, a main circuit through said indicating devices being adapted to be connected with a source of electric current, said indicating devices having a common parallel circuit connection with said main circuit, said circuit being adapted to feed the system over said common connection and over said common contact element, switch means associated with said main circuit and being adapted to be held in operative position during the operation of said indicating devices, separate electric interconnections between each wiper of said units and each individual contact of said set in the sequence of said switch units as they are coordinated to the rows of the devices in the one direction, individual electric interconnections between the contacts of each of said banks and said indicating devices in the order of the devices in the rows of the other direction, an actuating means associated with each of said indicating devices in series connection to said latter individual interconnections, a circuit maintaining means also associated with each of said indicating devices, said actuating means being adapted to operate the corresponding maintaining means upon actuating by the coordinated contacts of said banks and said set, said maintaining means being adapted to keep the associated indicating device operative after the associated actuating device has become inoperative due to change of positions of the coordinated wiper, means for moving all wipers of said switch units simultaneously, means for transporting said forms through said mechanism, said moving and transporting means being synchronized in such a manner that said wipers run through one cycle after completion of one predetermined portion of said forms, an actuating mechanism for said switch means, said actuating mechanism being synchronized with said moving and transporting means so as to operate said switch means in such a manner that it is brought in operative position at the beginning of each cycle and in inoperative position at the end of each cycle, a second gang of switch units, each having a contact bank with a plurality of contacts, the number of said latter switch units corresponding to the number of rows of said indicating devices in said other direction and the number of contacts of the banks in each of said latter switch units corresponding to the number of rows of indicating devices in said one direction, and a contacting wiper moving over each of said latter banks, said latter wipers being adapted to be operated simultaneously, said means for moving the wipers of said first gang of switch units being adapted to move also the wipers of said latter gang of switch units, coupling means between said moving means and said wipers of the two gangs, said coupling means being adapted to connect said gangs of wipers alternately.

3. In an electrically controlled indicating system, in combination a group of indicating devices arranged in rows of two intersecting directions, connectors individual to the several rows in the one direction of said indicating devices, each of said connectors comprising a bank of contacts and a wiper for engaging said contacts, a selector for preselecting said indicating devices in conformance with a given pattern, means for operating the connectors and the selector in synchronism, maintaining switches for controlling the operation of the several indicating devices, actuation circuits individual to and acting on said several maintaining switches including a given contact in a given bank of contacts and said selector, each of said actuation circuits being adapted to shunt the corresponding maintaining switch, if said circuit is closed over said given contact and said selector, utilization circuits including said maintaining switches controlled by said actuation circuits for independently actuating the indicator devices, a source of electrical energy common to the several circuits, and two control circuits for actuating the indicating devices, one of said control circuits being of lower voltage than the other, said control circuits having switching means for alternately supplying said voltages to the preselected indicating devices, the lower voltage being applied in the initial operation of the several devices.

4. In an electrically controlled indicating system, in combination a plurality of indicating devices changeable in aspect in the course of one operative cycle and arranged in groups of rows in two intersecting directions, means for selecting said indicating devices in accordance with a predetermined pattern, said means comprising a gang of switch units, each having a contact bank with a plurality of contacts, the number of said switch units corresponding to the number of rows of said indicating devices in the one direction and the number of contacts of the banks in each unit corresponding to the number of rows of indicating devices in the other direction, and a contacting wiper moving over each bank, a pre-selector comprising a form operated translating and transmitting mechanism, forms in said mechanism bearing predetermined patterns, said forms being adapted to be moved through said mechanism, a set of contacts in said mechanism arranged over the width of said forms transverse to their direction of movement and adapted to be rendered operative by said forms in accordance with the pattern on said forms, the number of said contacts of said set corresponding to the number of said contact banks, a common contact element in said mechanism opposite to said set, and being adapted to cooperate with the individual contacts of said set upon actuation of said individual contacts by said forms, a source of current, a main circuit including said indicating devices, and connected to said source of current, said indicating devices having a common parallel circuit connection with said main circuit, said main circuit being adapted to feed the system over said common connection and over said common contact element, switch means associated with said main circuit and being adapted to be held in operative position during the operation of said indicating devices, separate electric interconnections between each wiper of said units and each individual contact of said set in the sequence of said switch units as they are coordinated to the rows of the devices in the one direction, individual electric interconnections between the contacts of each of said banks and said indicating devices in the order of the devices in the rows of the other direction, an actuating means associated with each of said indicating devices in series connection to said latter individual interconnections, a circuit maintaining means also associated with each of said indicating devices, said actuating means being adapted to operate the corresponding maintaining means upon actuation by the coordinated contacts of said banks and said set, said maintaining means being adapted to keep the associated indicating device operative after the actuating device has become inoperative due to change of positions of the coordinated wiper, means for moving all wipers of said switch units simultaneously, means for transporting said forms through said mechanism, said moving and transporting means being synchronized in such a manner that said wipers run through one cycle after completion of one predetermined portion of each of said forms, an actuating mechanism for said switch means, said actuating mechanism being synchronized with said moving and transporting means so as to operate said switch means in such a manner that it is brought in operative position at the beginning of each cycle, and in inoperative position at the end of each cycle, said source of current alternately supplying voltages of a lower and a higher value, a change-over switch, operatively connected with said source for effecting the change in voltages, said indicating devices being adapted to respond to the changes in voltages in such a manner that, when the lower voltage is applied, the maintaining means of the selected devices are enabled to maintain their respective circuits, while the selected indicating devices are ineffective to indicate, and when the higher voltage is applied, the indicating devices are rendered operative to indicate and the maintaining means remain energized.

5. In an electrically controlled indicating system according to claim 4, said maintaining means comprising a pair of electric contacts, said actuating means having a heat-responsive element cooperatively connected with said pair of contacts, so as to actuate said contact pair in response to the heat generated by the flow of initial current through said element, said indicating device comprising a mechanically operable indicator, an electromagnet in series circuit connection with said contact pair and operatively connected to said indicator, said electromagnet being adapted to respond only to the higher of said two voltages.

6. In an electrically controlled indicating system according to claim 4, said maintaining means comprising two sets of pairs of contacts, both sets being adapted to be simultaneously operated by said actuating means, said indicating device, comprising an electric lamp in series circuit connection with the one of said sets of contact pairs, said change-over switch connecting said source of current and said sets contacts in such a manner that in the position in which the current of higher voltage is supplied, only that set of contacts which is in series connection with said lamp is operative, while in the position for the lower voltage only the other set is operative.

7. In an electrically controlled indicating system according to claim 4, said indicating devices being grouped into two groups, said source of current of two voltages being subdivided so as to supply said two groups of indicating devices separately, said change-over switch being adapted to control said subdivided portions of the current source simultaneously and in such a manner that the one of said groups is supplied with current of lower voltage, while the other one is supplied with current of higher voltage, in the one operative position of said change-over switch, and the supply of said groups with respect to said lower and higher voltage currents is reversed in the other operative position of said switch.

8. A sign board having a plurality of selectively controlled indicating devices to be operated individually with the aid of thermal relays which are under control of selecting means and which govern individual maintaining circuits through said indicating devices, said indicating means being mounted on one side of said board, said thermal relays being removably attached to said board at the other side, each just opposite to its corresponding indicating device, said thermal relays comprising relatively thin heat-responsive members, being adapted to control said maintaining circuits and to act as fuse elements, thus eliminating the use of separate fuse means.

9. In an electrically controlled indicating system comprising in combination, a plurality of indicating devices individually changeable in aspect under control of a current impulse transmitting selector according to a predetermined pattern, an actuating means and circuit associated with each indicating device and being adapted to be energized by the impulses of said transmitting selector, maintaining means and circuits operatively connected with each actuating means for maintaining said device operative after duration of the impulse, a second controlling means superimposing the control of the indicating devices selected at any instance by said selector, said second controlling means comprising a source of current, adapted to supply alternately a current of a lower and of a higher voltage to the whole system, a change-over switch, operatively connected with said source for effecting the changes in voltages, said indicating devices being adapted to respond to the changes in voltages in such a manner that, when the lower voltage is applied, the maintaining means of the selected devices are energized and enabled to maintain their respective maintaining circuits, while the selected indicating devices remain ineffective to indicate, and when the higher voltage is applied, the indicating devices are rendered operative to indicate, whereby the maintaining means continue to remain energized, said actuating means being energized to actuate said maintaining means independent from the supply of either of said two voltages.

10. In an electrically controlled indicating system according to claim 9, wherein said maintaining means comprises a pair of electric contacts, and said actuating means has a heat-responsive element cooperatively connected with said pair of contacts, so as to actuate said contact pair in response to the heat generated by the flow of initial current through said element, and said indicating device comprises a mechanically operable indicator, an electromagnet in series circuit connection with said contact pair and operatively connected to said indicator, said electromagnet being adapted to respond only to the higher of said two voltages.

11. In an electrically controlled indicating system, according to claim 9, said maintaining means comprising two sets of pairs of contacts, both sets being adapted to be simultaneously operated by said actuating means, said indicating device comprising an electric lamp in series circuit connection with the one of said sets of contact pairs, said change-over switch connecting said source of current and said sets contacts in such a manner that in the position, in which the current of higher voltage is supplied, only that set of contacts which is in series connection with said lamp is connected, while in the position for the lower voltage only the other set is connected.

12. In an electrically controlled indicating system according to claim 9, said indicating devices being grouped into two groups, said source of current of two voltages being subdivided so as to supply said two groups of indicating devices separately, said change-over switch being adapted to control said subdivided portions of the current source simultaneously and in such a manner that the one of said groups is supplied with current of lower voltage, while the other one is supplied with current of higher voltage, in the one operative position of said change-over switch, and the supply of said groups with respect to said lower and higher voltage currents is reversed in the other operative position of said switch.

ARMAND ZUCKERMANN.